US010361418B2

(12) United States Patent
Ogata et al.

(10) Patent No.: US 10,361,418 B2
(45) Date of Patent: Jul. 23, 2019

(54) LAMINATED BODY

(71) Applicant: Sumitomo Chemical Company, Limited, Tokyo (JP)

(72) Inventors: Toshihiko Ogata, Osaka (JP); Chikae Yoshimaru, Osaka (JP); Chikara Murakami, Osaka (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 15/627,629

(22) Filed: Jun. 20, 2017

(65) Prior Publication Data

US 2017/0365833 A1 Dec. 21, 2017

(30) Foreign Application Priority Data

Jun. 21, 2016 (JP) .................................. 2016-123055

(51) Int. Cl.
| | |
|---|---|
| H01M 2/14 | (2006.01) |
| H01M 2/16 | (2006.01) |
| H01M 10/0525 | (2010.01) |
| H01M 10/0585 | (2010.01) |
| B05D 1/18 | (2006.01) |
| B05D 1/42 | (2006.01) |

(52) U.S. Cl.
CPC ....... H01M 2/1686 (2013.01); H01M 2/1653 (2013.01); H01M 10/0525 (2013.01); H01M 10/0585 (2013.01); B05D 1/18 (2013.01); B05D 1/42 (2013.01)

(58) Field of Classification Search
CPC ............. H01M 2/1686; H01M 2/1653; H01M 10/0525; H01M 10/0585
See application file for complete search history.

(56) References Cited

U.S. PATENT DOCUMENTS

| | | | |
|---|---|---|---|
| 3,931,446 A | 1/1976 | Murayama et al. | |
| 5,051,183 A | 9/1991 | Takita et al. | |
| 7,208,555 B2 | 4/2007 | Tada et al. | |
| 8,931,647 B2 | 1/2015 | Shiki et al. | |
| 9,508,975 B1 | 11/2016 | Matsuo | |
| 10,074,840 B2 * | 9/2018 | Honda ................ | H01M 2/1686 |
| 2006/0014912 A1 | 1/2006 | Araki et al. | |
| 2007/0072069 A1 | 3/2007 | Yamada et al. | |
| 2007/0092705 A1 | 4/2007 | Lee et al. | |
| 2007/0190334 A1 | 8/2007 | Araki et al. | |
| 2007/0232709 A1 | 10/2007 | Lee et al. | |
| 2009/0101600 A1 | 4/2009 | Shiki et al. | |
| 2009/0111025 A1 | 4/2009 | Lee et al. | |
| 2009/0148659 A1 | 6/2009 | Ishiodori et al. | |
| 2010/0285341 A1 | 11/2010 | Yun et al. | |
| 2011/0212358 A1 | 9/2011 | Usami et al. | |
| 2011/0305940 A1 | 12/2011 | Usami et al. | |
| 2013/0089770 A1 | 4/2013 | Nishikawa | |
| 2013/0095365 A1 | 4/2013 | Nishikawa | |
| 2013/0196208 A1 | 8/2013 | Nemoto | |
| 2014/0178741 A1 | 6/2014 | Hasegawa et al. | |
| 2014/0272505 A1 | 9/2014 | Yoon et al. | |
| 2014/0363726 A1 | 12/2014 | Honda et al. | |
| 2015/0180002 A1 | 6/2015 | Nishikawa et al. | |
| 2015/0188108 A1 | 7/2015 | Miyazawa et al. | |
| 2015/0263325 A1 | 9/2015 | Honda et al. | |
| 2017/0033347 A1 | 2/2017 | Murakami et al. | |
| 2017/0033348 A1 | 2/2017 | Murakami et al. | |
| 2017/0036832 A1 | 2/2017 | Omura et al. | |
| 2017/0098809 A1 | 4/2017 | Ogata et al. | |
| 2017/0141373 A1 | 5/2017 | Murakami et al. | |
| 2017/0170443 A1 | 6/2017 | Murakami et al. | |
| 2017/0365831 A1 | 12/2017 | Ogata et al. | |
| 2017/0365832 A1 | 12/2017 | Ogata et al. | |
| 2017/0365833 A1 | 12/2017 | Ogata et al. | |
| 2017/0365834 A1 | 12/2017 | Ogata et al. | |
| 2017/0365878 A1 | 12/2017 | Ogata et al. | |

FOREIGN PATENT DOCUMENTS

| | | |
|---|---|---|
| CN | 1933923 A | 3/2007 |
| EP | 0834941 A1 | 4/1998 |
| JP | S5117274 A | 2/1976 |
| JP | H06-104736 B2 | 12/1994 |
| JP | H11-40129 A | 2/1999 |
| JP | H1186844 A | 3/1999 |

(Continued)

OTHER PUBLICATIONS

Office Action dated Jul. 29, 2016 in KR Application No. 1020160077240.
Office Action dated Jun. 28, 2016 in JP Application No. 2016024163.
Office Action dated Nov. 29, 2016 in JP Application No. 2016-024163.
Office Action dated Dec. 21, 2016 in KR Application No. 10-2016-0077240.
Office Action dated Apr. 19, 2017 in KR Application No. 10-2016-0077240.

(Continued)

*Primary Examiner* — Jane J Rhee

(74) *Attorney, Agent, or Firm* — Panitch Schwarze Belisario & Nadel LLP

(57) ABSTRACT

To afford a laminated body that is usable as a nonaqueous electrolyte secondary battery separator and that is not easily curled, a laminated body includes: a porous base material containing a polyolefin-based resin as a main component; and a porous layer containing a polyvinylidene fluoride-based resin, the porous base material having a temperature rise ending period of a particular value with respect to the amount of resin per unit area, the polyvinylidene fluoride-based resin containing crystal form α in an amount of not less than 36 mol % with respect to 100 mol % of a total amount of the crystal form α and crystal form β contained in the polyvinylidene fluoride-based resin.

7 Claims, No Drawings

(56) References Cited

FOREIGN PATENT DOCUMENTS

| | | |
|---|---|---|
| JP | H11300180 A | 11/1999 |
| JP | 2001-118558 A | 4/2001 |
| JP | 2005179562 A | 7/2005 |
| JP | 2005200623 A | 7/2005 |
| JP | 2005343957 A | 12/2005 |
| JP | 2008062229 A | 3/2008 |
| JP | 4247027 B2 | 4/2009 |
| JP | 2009104967 A | 5/2009 |
| JP | 2009185093 A | 8/2009 |
| JP | 2009-256404 A | 11/2009 |
| JP | 2010-540744 A | 12/2010 |
| JP | 201346998 A | 3/2013 |
| JP | 5355823 B1 | 11/2013 |
| JP | 5432417 B2 | 3/2014 |
| JP | 5553165 B2 | 7/2014 |
| JP | 2015111461 A | 6/2015 |
| JP | 2016-040354 A | 3/2016 |
| JP | 2016-051695 A | 4/2016 |
| JP | 5932161 B2 | 6/2016 |
| KR | 20060072065 A | 6/2006 |
| KR | 10-2006-0101541 | 9/2006 |
| KR | 10-2006-0118668 A | 11/2006 |
| KR | 20090037552 A | 4/2009 |
| KR | 20130031319 A | 3/2013 |
| KR | 2013-0036043 A | 4/2013 |
| KR | 10-1430975 B1 | 8/2014 |
| KR | 10-2014-0112668 A | 9/2014 |
| KR | 2014-0112668 A | 9/2014 |
| KR | 20140113186 A | 9/2014 |
| KR | 101479749 B1 | 1/2015 |
| KR | 20150020667 A | 2/2015 |
| KR | 10-1510972 B1 | 4/2015 |
| KR | 20160002173 A | 1/2016 |
| KR | 20160038918 A | 4/2016 |
| WO | 2007119850 A1 | 10/2007 |
| WO | 2008018181 A1 | 2/2008 |
| WO | 2012137375 A1 | 10/2012 |
| WO | 2013073503 A1 | 5/2013 |
| WO | 2013/099539 A1 | 7/2013 |
| WO | 2016152863 A1 | 9/2016 |

OTHER PUBLICATIONS

Martins et al, "Electroactive Phases of Poly(Vinylidene Fluoride): Determination, Processing, and Applications," Progress in Polymer Science, vol. 39, pp. 683-706 (2014).

Office Action dated May 16, 2017 in JP Application No. 2017033720.

Office Action dated Mar. 28, 2018 in CN Application No. 201610865635.7.

Office Action dated Aug. 18, 2017 in KR Application No. 10-2017-0041611.

Office Action dated Aug. 18, 2017 in KR Application No. 10-2017-0041366.

Mohammadi et al., "Effect of Tensile Strain Rate and Elongation on Crystalline Structure and Piezoelectric properties of PVDF Thin Films" Polymer Testing, vol. 26, pp. 42-50 (2007).

Office Action dated Aug. 18, 2017 in KR Application No. 10-2017-0041595.

Office Action dated Oct. 22, 2018 in U.S. Appl. No. 15/627,556 by Ogata.

Office Action dated Oct. 22, 2018 in U.S. Appl. No. 15/627,671 by Ogata.

Office Action dated Dec. 31, 2018 in U.S. Appl. No. 15/627,736 for Ogata.

Office Action dated Oct. 22, 2018 in U.S. Appl. No. 15/627,664 by Ogata.

Office Action dated Aug. 18, 2017 in KR Application No. 10-2017-0041604.

Office Action dated Dec. 20, 2018 in U.S. Appl. No. 15/627,585 by Ogata.

Office Action dated Apr. 10, 2019 in U.S. Appl. No. 15/627,585 by Ogata.

* cited by examiner

LAMINATED BODY

This Nonprovisional application claims priority under 35 U.S.C. § 119 on Patent Application No. 2016-123055 filed in Japan on Jun. 21, 2016, the entire contents of which are hereby incorporated by reference.

TECHNICAL FIELD

The present invention relates to a laminated body, and more specifically, to a laminated body usable as a separator for a nonaqueous electrolyte secondary battery (hereinafter referred to as a "nonaqueous electrolyte secondary battery separator").

BACKGROUND ART

Nonaqueous electrolyte secondary batteries such as a lithium-ion secondary battery have a high energy density, and are thus in wide use as batteries for devices such as a personal computer, a mobile telephone, and a portable information terminal. Such nonaqueous electrolyte secondary batteries have recently been developed as on-vehicle batteries.

In a nonaqueous electrolyte secondary battery, the electrodes expand and contract repeatedly as the nonaqueous electrolyte secondary battery is charged and discharged. The electrodes and the separator thus cause stress on each other. This, for example, causes the electrode active materials to fall off and consequently increases the internal resistance, unfortunately resulting in a degraded cycle characteristic. In view of that, there has been proposed a technique of coating the surface of a separator with an adhesive material such as polyvinylidene fluoride for increased adhesiveness between the separator and electrodes (see Patent Literatures 1 and 2). Coating a separator with an adhesive material, however, has been causing the separator to curl visibly. A curled separator cannot be handled easily during production, which may unfortunately lead to problems during battery preparation such as defective rolling and defective assembly.

CITATION LIST

Patent Literature

[Patent Literature 1] Japanese Patent No. 5355823 (Publication Date: Nov. 27, 2013)
[Patent Literature 2] Japanese Patent Application Publication, Tokukai, No. 2001-118558 (Publication Date: Apr. 27, 2001)

SUMMARY OF INVENTION

Technical Problem

The present invention has been accomplished in view of the above issue. It is an object of the present invention to sufficiently prevent a separator from curling.

Solution to Problem

In order to attain the above object, the inventor of the present invention has conducted diligent research and have thus discovered that a separator capable of sufficiently preventing itself from curling can be produced from a laminated body including (i) a porous base material containing a polyolefin resin as a main component and (ii) a porous layer disposed on the porous base material which porous layer contains a polyvinylidene fluoride-based resin (hereinafter also referred to as "PVDF-based resin"), the polyvinylidene fluoride-based resin having moderately controlled crystal forms. Further, the porous base material has a temperature rise ending period of 2.9 seconds·m$^2$/g to 5.7 seconds·m$^2$/g with respect to an amount of resin per unit area in a case where the porous base material has been impregnated with N-methylpyrrolidone containing 3% by weight of water and has then been irradiated with a microwave having a frequency of 2455 Hz and an output of 1800 W.

The laminated body in accordance with an embodiment of the present invention may preferably be arranged such that the polyvinylidene fluoride-based resin includes (i) a homopolymer of vinylidene fluoride and/or (ii) a copolymer of vinylidene fluoride and at least one monomer selected from the group consisting of hexafluoropropylene, tetrafluoroethylene, trifluoroethylene, trichloroethylene, and vinyl fluoride.

The laminated body in accordance with an embodiment of the present invention may preferably be arranged such that the polyvinylidene fluoride-based resin has a weight-average molecular weight of not less than 200,000 and not more than 3,000,000.

The laminated body in accordance with an embodiment of the present invention may preferably be arranged such that the porous layer contains a filler.

The laminated body in accordance with an embodiment of the present invention may preferably be arranged such that the filler has a volume-average particle size of not less than 0.01 μm and not more than 10 μm.

A member for a nonaqueous electrolyte secondary battery (hereinafter referred to as a "nonaqueous electrolyte secondary battery member") in accordance with an embodiment of the present invention includes: a cathode; a laminated body in accordance with an embodiment of the present invention; and an anode, the cathode, the laminated body, and the anode being arranged in this order.

A nonaqueous electrolyte secondary battery in accordance with an embodiment of the present invention includes as a separator a laminated body in accordance with an embodiment of the present invention.

Advantageous Effects of Invention

An embodiment of the present invention can advantageously prevent curls.

DESCRIPTION OF EMBODIMENTS

The following description will discuss an embodiment of the present invention. The present invention is, however, not limited to the embodiment below. The present invention is not limited to the arrangements described below, but may be altered in various ways by a skilled person within the scope of the claims. Any embodiment based on a proper combination of technical means disclosed in different embodiments is also encompassed in the technical scope of the present invention. Note that numerical expressions such as "A to B" herein mean "not less than A and not more than B" unless otherwise stated.

[1. Laminated Body]

A laminated body of the present embodiment includes: a porous base material containing a polyolefin-based resin as a main component; and a porous layer on at least one surface of the porous base material, the porous layer containing a polyvinylidene fluoride-based resin, the porous base material having a temperature rise ending period of 2.9 seconds·m²/g to 5.7 seconds·m²/g with respect to an amount of resin per unit area in a case where the porous base material has been impregnated with N-methylpyrrolidone containing 3% by weight of water and has then been irradiated with a microwave having a frequency of 2455 Hz and an output of 1800 W, the polyvinylidene fluoride-based resin containing crystal form α in an amount of not less than 36 mol % with respect to 100 mol % of the total amount of the crystal form α and crystal form β contained in the polyvinylidene fluoride-based resin, where the amount of the crystal form α is calculated from an absorption intensity at around 765 $cm^{-1}$ in an IR spectrum of the porous layer, and an amount of the crystal form β is calculated from an absorption intensity at around 840 $cm^{-1}$ in the IR spectrum of the porous layer.

The following description will discuss individual components.

[1-1. Porous Base Material]

The porous base material in accordance with an embodiment of the present invention is a porous film included in a nonaqueous electrolyte secondary battery and disposed between the cathode and the anode.

The porous base material simply needs to be a porous, filmy base material containing a polyolefin-based resin as a main component (polyolefin-based porous base material). The porous base material is a film that contains pores connected to one another and that allows a gas, a liquid, or the like to pass therethrough from one surface to the other.

The term "main component" intends to mean accounting for not less than 50% by volume of the porous base material in its entirety.

The porous base material is arranged such that in a case where the battery generates heat, the porous film is melted so as to make the laminated body (which functions as a nonaqueous electrolyte secondary battery separator) non-porous. This allows the porous base material to impart a shutdown function to the laminated body (which functions as a nonaqueous electrolyte secondary battery separator). The porous base material may include a single layer or a plurality of layers.

The inventors of the present invention have discovered a relationship between (i) a time period (temperature rise ending period) that elapses before the end of a rise in the temperature of a porous base material in a case where the porous base material has been impregnated with N-methyl-pyrrolidone containing 3% by weight of water and has then been irradiated with a microwave having a frequency of 2455 Hz and an output of 1800 W and (ii) the initial rate characteristic of a battery including the porous base material and how the rate characteristic is degraded as the battery is charged and discharged repeatedly.

When a nonaqueous electrolyte secondary battery is charged and discharged, the electrodes expand. Specifically, the anode expands when the battery is charged, whereas the cathode expands when the battery is discharged. Thus, the electrolyte inside the porous base material is pushed out from the side of the expanding electrode to the side of the opposite electrode. This mechanism causes the electrolyte to move out from and into the porous base material during a charge and discharge cycle. Since the porous base material contains pores as described above, the electrolyte moves in and out through those pores.

When the electrolyte moves through the pores of the porous base material, the wall surface of the pores is subjected to stress caused by the movement. The strength of the stress is related to the structure of the pores, that is, the capillary force in the pores connected to one another and the area of the wall of the pores. Specifically, the wall surface of the pores is subjected to stress that is presumably higher with a stronger capillary force and with a larger area of the wall surface of the pores. In addition, the strength of the stress is also related to the amount of electrolyte moving through the pores: the stress is presumably stronger with a larger amount of electrolyte moving through the pores, that is, in a case where the battery is used with a larger electric current. An increase in the stress deforms the wall surface in such a manner that the wall surface blocks the pores, with the result of degradation in the battery output characteristic. The rate characteristic is thus gradually degraded as the battery is charged and discharged repeatedly and/or the battery is used with a large electric current.

In a case where the electrolyte is pushed out from the porous base material in only a small amount, the amount of electrolyte with respect to an electrode surface is decreased, or the electrolyte is dried up locally on an electrode surface. This may lead to an increase in the amount of a degradation product of the electrolyte. Such a degradation product of the electrolyte can cause a nonaqueous electrolyte secondary battery to have a degraded rate characteristic.

As described above, there is a relationship between (i) the structure of pores of a porous base material (namely, the capillary force in the pores and the area of the wall of the pores) and the capability to supply an electrolyte from the porous base material to the electrodes and (ii) how the rate characteristic is degraded as the battery is charged and discharged repeatedly and/or the battery is used with a large electric current. In view of that, the inventors of the present invention focused on how the temperature of a porous base material changes in a case where the porous base material has been impregnated with N-methylpyrrolidone containing 3% by weight of water and has then been irradiated with a microwave having a frequency of 2455 Hz and an output of 1800 W.

Irradiating a porous base material containing N-methyl-pyrrolidone containing water with a microwave causes the porous base material to generate heat due to vibrational energy of the water. The heat generated is transmitted to the resin contained in the porous base material which resin is in contact with the N-methylpyrrolidone containing water. The temperature rise ends when equilibrium is reached between (i) the rate of heat generation and (ii) the rate of cooling due to transfer of heat to the resin. This indicates that the time period that elapses before the end of a temperature rise (that is, the temperature rise ending period) is related to the degree of contact between (i) the liquid contained in the porous base material (in this example, N-methylpyrrolidone containing water) and (ii) the resin contained in the porous base material. The degree of contact between the liquid contained in the porous base material and the resin contained in the porous base material is closely related to the capillary force in the pores of the porous base material and the area of the wall of the pores. Thus, the temperature rise ending period can be used for evaluation of the structure of pores of a porous base material (namely, the capillary force in the pores and the area of the wall of the pores). Specifically, a shorter temperature rise ending period indicates that the capillary force in the pores is larger and that the area of the wall of the pores is larger.

The degree of contact between the liquid contained in the porous base material and the resin contained in the porous base material is presumably larger in a case where liquid moves more easily through the pores of the porous base material. This makes it possible to use the temperature rise ending period for evaluation of the capability to supply an electrolyte from the porous base material to the electrodes. Specifically, a shorter temperature rise ending period indicates a higher capability to supply an electrolyte from the porous base material to the electrodes.

A porous base material for an embodiment of the present invention has a temperature rise ending period of 2.9 seconds·m$^2$/g to 5.7 seconds·m$^2$/g, preferably 2.9 seconds·m$^2$/g to 5.3 seconds·m$^2$/g, with respect to the amount of resin per unit area (weight per unit area).

If the temperature rise ending period with respect to the amount of resin per unit area is less than 2.9 seconds·m$^2$/g, both the capillary force in the pores of the porous base material and the area of the wall of the pores will be excessively large. This will lead to an increase in the stress caused on the wall of the pores when the electrolyte moves through the pores during a charge and discharge cycle and/or during use of the battery with a large electric current. This will in turn block the pores, with the result of degradation in the battery output characteristic.

If the temperature rise ending period with respect to the amount of resin per unit area is more than 5.7 seconds·m$^2$/g, liquid will move less easily through the pores of the porous base material, and in a case where the porous base material is used as a separator for a nonaqueous electrolyte secondary battery, the electrolyte will move more slowly near the interface between the porous base material and an electrode, with the result of a decrease in the rate characteristic of the battery. In addition, when the battery has been charged and discharged repeatedly, the electrolyte will be more likely dried up locally at the interface between the separator and an electrode or inside the porous base material. This will in turn lead to an increase in the internal resistance of the battery, with the result of a nonaqueous electrolyte secondary battery having a rate characteristic that is degraded through a charge and discharge cycle.

In contrast, a temperature rise ending period of 2.9 seconds·m$^2$/g to 5.7 seconds·m$^2$/g with respect to the amount of resin per unit area allows for an excellent initial rate characteristic and prevents the rate characteristic from being degraded through a charge and discharge cycle, as demonstrated in the Examples described later.

The porous base material may have any film thickness that is selected as appropriate in view of the thickness of a nonaqueous electrolyte secondary battery member to be included in a nonaqueous electrolyte secondary battery to be produced. The porous base material has a film thickness of preferably 4 μm to 40 μm, more preferably 5 μm to 30 μm, further preferably 6 μm to 15 μm The porous base material has a volume-based porosity of 20% by volume to 80% by volume, preferably 30% by volume to 75% by volume, so as to (i) retain a larger amount of electrolyte and (ii) obtain the function of reliably preventing (shutting down) a flow of an excessively large electric current at a lower temperature. Further, in order to obtain sufficient ion permeability and prevent particles from entering the cathode and/or the anode in a case where the laminated body is used as a separator, the porous base material has pores having an average diameter (average pore diameter) of preferably not more than 0.3 μm, more preferably not more than 0.14 μm.

The porous base material contains a polyolefin component at a proportion of not less than 50% by volume, preferably not less than 90% by volume, more preferably not less than 95% by volume, with respect to the entire porous base material. The porous base material preferably contains, as the polyolefin component, a high molecular weight component having a weight-average molecular weight of $5 \times 10^5$ to $15 \times 10^6$. The porous base material preferably contains a polyolefin component having a weight-average molecular weight of not less than 1,000,000 because such a polyolefin component allows the porous base material and a nonaqueous electrolyte secondary battery separator in its entirety to have a higher strength.

Examples of the polyolefin-based resin contained in the porous base material include high molecular weight homopolymers and copolymers produced through polymerization of ethylene, propylene, 1-butene, 4-methyl-1-pentene, and 1-hexene. The porous base material can include a layer containing only one of these polyolefin-based resins and/or a layer containing two or more of these polyolefin-based resins. The polyolefin-based resin is, in particular, preferably a high molecular weight polyethylene containing ethylene as a main component. The porous base material may contain a component(s) other than polyolefin as long as such a component does not impair the function of the layer.

Examples of the polyethylene-based resin include low-density polyethylene, high-density polyethylene, linear polyethylene (ethylene-a-olefin copolymer), and ultra-high molecular weight polyethylene having a weight-average molecular weight of not less than 1,000,000. Among these examples, ultra-high molecular weight polyethylene having a weight-average molecular weight of not less than 1,000,000 is further preferable.

The porous base material has an air permeability within a range of normally 30 seconds/100 cc to 500 seconds/100 cc, preferably 50 seconds/100 cc to 300 seconds/100 cc, in terms of Gurley values. A porous base material having an air permeability within the above range allows for sufficient ion permeability in a case where the laminated body is used as a separator.

The porous base material has a weight per unit area of preferably 4 g/m$^2$ to 20 g/m$^2$, more preferably 4 g/m$^2$ to 12 g/m$^2$, even more preferably 5 g/m$^2$ to 12 g/m$^2$. This is because such a weight per unit area of the porous base material can increase (i) the strength, thickness, handling easiness, and weight of the porous base material and (ii) the weight energy density and volume energy density of a nonaqueous electrolyte secondary battery including the laminated body as a nonaqueous electrolyte secondary battery separator.

The physical property values of the porous base material, which is included in a laminated body including the porous base material and a porous layer, can be measured after the porous layer is removed from the laminated body. The porous layer can be removed from the laminated body by, for example, a method of dissolving the resin of the porous layer with use of a solvent such as N-methylpyrrolidone or acetone for removal.

The following description will discuss a method for producing a porous base material. The porous base material containing a polyolefin-based resin as a main component, for example, a porous base material containing (i) ultra-high molecular weight polyethylene and (ii) a polyolefin resin containing a low molecular weight polyolefin having a weight-average molecular weight of not more than 10,000, is preferably produced by a method as described below.

Specifically, the porous base material can be obtained by a method including the steps of (1) obtaining a polyolefin resin composition by kneading (i) ultra-high molecular weight polyethylene, (ii) a low molecular weight polyolefin having a weight-average molecular weight of not more than 10,000, and (iii) a pore forming agent such as calcium carbonate or a plasticizing agent, (2) forming (rolling) a sheet with use of a reduction roller to roll the polyolefin resin composition obtained in the step (1), (3) removing the pore forming agent from the sheet obtained in the step (2), and (4) obtaining a porous base material by stretching the sheet obtained in the step (3).

The structure of pores of a porous base material (namely, the capillary force of the pores, the area of the wall of the pores, and stress remaining in the porous base material) is influenced by the straining rate during the stretching in the step (4) and the temperature during a heat-fixation treatment (annealing treatment) after the stretching per unit thickness of the stretched film (that is, a heat-fixation temperature per unit thickness of the stretched film). Thus, in a case where the straining rate and the heat-fixation temperature per unit thickness of the stretched film have been adjusted, controlling the structure of the pores of the porous base material makes it possible to control the temperature rise ending period with respect to the amount of resin per unit area.

Specifically, a porous base material for an embodiment of the present invention tends to be produced in a case where the straining rate and the heat-fixation temperature per unit thickness of the stretched film have been so adjusted as to be, on a graph having an X axis indicative of the straining rate and a Y axis indicative of the heat-fixation temperature per unit thickness of the stretched film, within a triangular area having three vertices at (i) 500% per minute and 1.5° C./μm (ii) 900% per minute and 14.0° C./μm, and (iii) 2500% per minute and 11.0° C./μm. The straining rate and the heat-fixation temperature per unit thickness of the stretched film are preferably so adjusted as to be within a triangular area having three vertices at (i) 600% per minute and 5.0° C./μm (ii) 900% per minute and 12.5° C./μm, and (iii) 2500% per minute and 11.0° C./μm.

[1-2. Porous Layer]

The porous layer is disposed on one surface or both surfaces of the porous base material as a porous film as necessary. It is preferable that the resin of which the porous layer is made be insoluble in the electrolyte of the battery and be electrochemically stable when the battery is in normal use. In a case where the porous layer is disposed on one surface of the porous base material, the porous layer is disposed preferably on a surface of the porous base material which surface faces the cathode of the nonaqueous electrolyte secondary battery, more preferably on a surface of the porous base material which surface is in contact with the cathode.

The porous layer for an embodiment of the present invention contains a polyvinylidene fluoride-based resin, the polyvinylidene fluoride-based resin containing crystal form α in an amount of not less than 36 mol % with respect to 100 mol % of the total amount of the crystal form α and crystal form β contained in the polyvinylidene fluoride-based resin.

The amount of crystal form α is calculated from the absorption intensity at around 765 cm$^{-1}$ in the IR spectrum of the porous layer, while the amount of crystal form β is calculated from the absorption intensity at around 840 cm$^{-1}$ in the IR spectrum of the porous layer.

The porous layer for an embodiment of the present invention contains a polyvinylidene fluoride-based resin (PVDF-based resin). The porous layer contains a large number of pores connected to one another, and thus allows a gas or a liquid to pass therethrough from one surface to the other. Further, in a case where the porous layer for an embodiment of the present invention is used as a constituent member of a nonaqueous electrolyte secondary battery separator, the porous layer can be a layer capable of adhering to an electrode as the outermost layer of the separator.

Examples of the PVDF-based resin include homopolymers of vinylidene fluoride (that is, polyvinylidene fluoride); copolymers (for example, polyvinylidene fluoride copolymer) of vinylidene fluoride and other monomer(s) polymerizable with vinylidene fluoride; and mixtures of the above polymers. Examples of the monomer polymerizable with vinylidene fluoride include hexafluoropropylene, tetrafluoroethylene, trifluoroethylene, trichloroethylene, and vinyl fluoride. An embodiment of the present invention can use (i) one kind of monomer or (ii) two or more kinds of monomers selected from above. The PVDF-based resin can be synthesized through emulsion polymerization or suspension polymerization.

The PVDF-based resin contains vinylidene fluoride at a proportion of normally not less than 85 mol %, preferably not less than 90 mol %, more preferably not less than 95 mol %, further preferably not less than 98 mol %. A PVDF-based resin containing vinylidene fluoride at a proportion of not less than 85 mol % is more likely to allow a porous layer to have a mechanical strength against pressure and a heat resistance against heat during battery production.

The porous layer can also preferably contain two kinds of PVDF-based resins (that is, a first resin and a second resin below) that differ from each other in terms of, for example, the hexafluoropropylene content.

The first resin is (i) a vinylidene fluoride-hexafluoropropylene copolymer containing hexafluoropropylene at a proportion of more than 0 mol % and not more than 1.5 mol % or (ii) a vinylidene fluoride homopolymer (containing hexafluoropropylene at a proportion of 0 mol %).

The second resin is a vinylidene fluoride-hexafluoropropylene copolymer containing hexafluoropropylene at a proportion of more than 1.5 mol %.

A porous layer containing the two kinds of PVDF-based resins adheres better to an electrode than a porous layer not containing one of the two kinds of PVDF-based resins. Further, a porous layer containing the two kinds of PVDF-based resins adheres better to another layer (for example, the porous base material layer) included in a nonaqueous electrolyte secondary battery separator, with the result of a higher peel force between the two layers, than a porous layer not containing one of the two kinds of PVDF-based resins. The first resin and the second resin are preferably mixed at a mixing ratio (mass ratio, first resin:second resin) of 15:85 to 85:15.

The PVDF-based resin has a weight-average molecular weight of preferably 200,000 to 3,000,000. A PVDF-based resin having a weight-average molecular weight of not less than 200,000 tends to allow a porous layer to attain a mechanical property enough for the porous layer to endure a process of adhering the porous layer to an electrode, thereby allowing the porous layer and the electrode to adhere to each other sufficiently. A PVDF-based resin having a weight-average molecular weight of not more than 3,000,000 tends to not cause the coating solution, which is to be applied to form a porous layer, to have too high a viscosity, which allows the coating solution to have excellent shaping easiness. The weight-average molecular weight of the PVDF-based resin is more preferably 200,000 to 2,000,000, further preferably 500,000 to 1,500,000.

The PVDF-based resin has a fibril diameter of preferably 10 nm to 1000 nm in view of the cycle characteristic of a nonaqueous electrolyte secondary battery containing the porous layer.

The porous layer for an embodiment of the present invention may contain a resin other than the PVDF-based resin. Examples of the other resin include styrene-butadiene copolymers; homopolymers or copolymers of vinyl nitriles such as acrylonitrile and methacrylonitrile; and polyethers such as polyethylene oxide and polypropylene oxide.

The porous layer for an embodiment of the present invention may contain a filler. The filler may be an inorganic or organic filler. In a case where the porous layer for an embodiment of the present invention contains a filler, the filler is contained at a proportion of preferably not less than 1% by mass and not more than 99% by mass, more preferably not less than 10% by mass and not more than 98% by mass, with respect to the total amount of the polyvinylidene fluoride-based resin and the filler combined. Containing a filler allows a separator including the porous layer to have improved slidability and heat resistance, for example. The filler may be any inorganic or organic filler that is stable in a nonaqueous electrolyte and that is stable electrochemically. The filler preferably has a heat-resistant temperature of not lower than 150° C. to ensure safety of the battery.

Examples of the organic filler include: crosslinked polyacrylic acid, crosslinked polyacrylic acid ester, crosslinked polymethacrylic acid, and crosslinked polymethacrylic acid esters such as crosslinked polymethyl methacrylate; fine particles of crosslinked polymers such as crosslinked polysilicone, crosslinked polystyrene, crosslinked polydivinyl benzene, a crosslinked product of a styrene-divinylbenzene copolymer, polyimide, a melamine resin, a phenol resin, and a benzoguanamine-formaldehyde condensate; and fine particles of heat-resistant polymers such as polysulfone, polyacrylonitrile, polyaramid, polyacetal, and thermoplastic polyimide.

A resin (polymer) contained in the organic filler may be a mixture, a modified product, a derivative, a copolymer (a random copolymer, an alternating copolymer, a block copolymer, or a graft copolymer), or a crosslinked product of any of the molecular species listed above as examples.

Specific examples of the organic filler also include fillers made of (i) a homopolymer of a monomer such as styrene, vinyl ketone, acrylonitrile, methyl methacrylate, ethyl methacrylate, glycidyl methacrylate, glycidyl acrylate, or methyl acrylate, or (ii) a copolymer of two or more of such monomers; fluorine-containing resins such as polytetrafluoroethylene, an ethylene tetrafluoride-propylene hexafluoride copolymer, an ethylene tetrafluoride-ethylene copolymer, and polyvinylidene fluoride; melamine resin; urea resin; polyethylene; polypropylene; polyacrylic acid and polymethacrylic acid; and the like.

Examples of the inorganic filler include metal hydroxides such as aluminum hydroxide, magnesium hydroxide, calcium hydroxide, chromium hydroxide, zirconium hydroxide, nickel hydroxide, and boron hydroxide; metal oxides such as alumina and zirconia, and hydrates thereof; carbonates such as calcium carbonate and magnesium carbonate; sulfates such as barium sulfate and calcium sulfate; and clay minerals such as calcium silicate and talc. The inorganic filler is preferably a metal hydroxide, a hydrate of a metal oxide, or a carbonate to improve the safety of the battery, for example, to impart fire retardance. The inorganic filler is preferably a metal oxide in terms of insulation and oxidation resistance.

Specific examples of the inorganic filler also include fillers made of inorganic matters such as calcium carbonate, talc, clay, kaolin, silica, hydrotalcite, diatomaceous earth, magnesium carbonate, barium carbonate, calcium sulfate, magnesium sulfate, barium sulfate, aluminum hydroxide, magnesium hydroxide, calcium oxide, magnesium oxide, titanium oxide, titanium nitride, alumina (aluminum oxide), aluminum nitride, mica, zeolite, and glass.

An embodiment of the present invention may use (i) only one filler or (ii) two or more kinds of fillers in combination. Alternatively, the organic filler(s) and the inorganic filler(s) may be used in combination.

The filler has a volume average particle size of preferably 0.01 µm to 10 µm in order to ensure (i) fine adhesion and fine slidability and (ii) shaping easiness of the laminated body. The volume average particle size has a lower limit of more preferably not less than 0.05 µm, further preferably not less than 0.1 µm. The volume average particle size has an upper limit of more preferably not more than 5 µm, further preferably not more than 1 µm.

The filler may have any shape. The filler may, for example, be a particulate filler. Example shapes of the particles include a sphere, an ellipse, a plate shape, a bar shape, and an irregular shape. In order to prevent a short circuit in the battery, the filler is preferably in the form of (i) plate-shaped particles or (ii) primary particles that are not aggregated.

The filler forms fine bumps on a surface of the porous layer, thereby improving the slidability. A filler including (i) plate-shaped particles or (ii) primary particles that are not aggregated forms finer bumps on a surface of the porous layer so that the porous layer adheres better to an electrode.

The porous layer for an embodiment of the present invention has an average thickness of preferably 0.5 µm to 10 µm, more preferably 1 µm to 5 µm, on one surface of the porous base material in order to ensure adhesion to an electrode and a high energy density.

<Crystal Forms of PVDF-Based Resin>

The PVDF-based resin in the porous layer for an embodiment of the present invention contains crystal form α in an amount of not less than 36 mol %, preferably not less than 39 mol %, more preferably not less than 40 mol %, more preferably not less than 50 mol %, more preferably not less than 60 mol %, further preferably not less than 70 mol %, with respect to 100 mol % of the total amount of crystal form α and crystal form β contained. Further, the amount of crystal form α is preferably not more than 95 mol %. Containing crystal form α in an amount of not less than 36 mol % allows a laminated body including the porous layer to be used as a member of a nonaqueous electrolyte secondary battery such as a nonaqueous electrolyte secondary battery separator that is not easily curled.

A laminated body in accordance with an embodiment of the present invention can prevent itself from curling presumably because, for example, (i) a smaller content of the PVDF-based resin having crystal form β, which PVDF-based resin strongly adheres to the porous base material, allows the porous layer to be deformed to only a moderately smaller degree in response to deformation of the porous base material and/or (ii) a larger content of the PVDF-based resin having crystal form α, which PVDF-based resin is high in rigidity, allows the porous layer to be more resistant to deformation.

The PVDF-based resin having crystal form α is arranged such that in the PVDF skeleton contained in the polymer of the PVDF-based resin, with respect to a fluorine atom (or a hydrogen atom) bonded to a single main-chain carbon atom in the molecular chains contained in the PVDF skeleton, one adjacent carbon atom is bonded to a hydrogen atom (or a fluorine atom) having a trans position relative to the above fluorine atom (or the above hydrogen atom), and the other (opposite) adjacent carbon atom is bonded to a hydrogen atom (or a fluorine atom) having a gauche position (positioned at an angle of 60°) relative to the above fluorine atom (or the above hydrogen atom), wherein two or more such conformations are chained consecutively as follows:

$$\text{(TGT}\overline{\text{G}}\text{ structure)} \qquad [\text{Math. 1}]$$

and the molecular chains each have the following type:

$$\text{TGT}\overline{\text{G}} \qquad [\text{Math. 2}]$$

wherein the respective dipole moments of C—F$_2$ and C—H$_2$ bonds each have a component perpendicular to the molecular chain and a component parallel to the molecular chain.

The PVDF-based resin having crystal form α has characteristic peaks (characteristic absorptions) at around 1,212 cm$^{-1}$, around 1,183 cm$^{-1}$, and around 765 cm$^{-1}$ in its IR spectrum. The PVDF-based resin having crystal form α has characteristic peaks at around 2θ=17.7°, around 2θ=18.3°, and around 2θ=19.9° in a powder X-ray diffraction analysis.

The PVDF-based resin having crystal form β is arranged such that in the PVDF skeleton contained in the polymer of the PVDF-based resin, a main-chain carbon atom in the molecular chains contained in the PVDF skeleton is adjacent to two carbon atoms bonded to a fluorine atom and a hydrogen atom, respectively, having a trans conformation (TT-type conformation), that is, the fluorine atom and the hydrogen atom bonded respectively to the two adjacent carbon atoms are positioned at an angle of 180° to the direction of the carbon-carbon bond.

The PVDF-based resin having crystal form β may be arranged such that the polymer of the PVDF-based resin contains a PVDF skeleton that has a TT-type conformation in its entirety. The PVDF-based resin having crystal form β may alternatively be arranged such that a portion of the PVDF skeleton has a TT-type conformation and that the PVDF-based resin having crystal form β has a molecular chain of the TT-type conformation in at least four consecutive PVDF monomeric units. In either case, (i) the carbon-carbon bond, in which the TT-type conformation constitutes a TT-type main chain, has a planar zigzag structure, and (ii) the respective dipole moments of C—F$_2$ and C—H$_2$ bonds each have a component perpendicular to the molecular chain.

The PVDF-based resin having crystal form β has characteristic peaks (characteristic absorptions) at around 1,274 cm$^{-1}$, around 1,163 cm$^{-1}$, and around 840 cm$^{-1}$ in its IR spectrum. The PVDF-based resin having crystal form β has a characteristic peak at around 2θ=21° in a powder X-ray diffraction analysis.

A PVDF-based resin having crystal form γ is arranged such that the polymer of the PVDF-based resin contains a PVDF skeleton that has a conformation in which TT-type conformations and TG-type conformations appear consecutively and alternately. The PVDF-based resin having crystal form γ has characteristic peaks (characteristic absorptions) at around 1,235 cm$^{-1}$ and around 811 cm$^{-1}$ in its IR spectrum. The PVDF-based resin having crystal form γ has a characteristic peak at around 2θ=18° in a powder X-ray diffraction analysis.

<Method for Calculating Content Rates of Crystal Form α and Crystal Form β in PVDF-Based Resin>

The respective content rates of crystal form α and crystal form β in the PVDF-based resin can be calculated by, for example, the methods (i) to (iii) below.

(i) Calculation Formula $$\text{Law of Beer: } A = \varepsilon b C \qquad (1)$$

where A represents an absorbance, ε represents a molar extinction coefficient, b represents an optical path length, and C represents a concentration.

Assuming that on the basis of the above formula (1), $A^\alpha$ represents the absorbance of the characteristic absorption of crystal form α, $A^\beta$ represents the absorbance of the characteristic absorption of crystal form β, $\varepsilon^\alpha$ represents the molar extinction coefficient of the PVDF-based resin having crystal form α, $\varepsilon^\beta$ represents the molar extinction coefficient of the PVDF-based resin having crystal form β, $C^\alpha$ represents the concentration of the PVDF-based resin having crystal form α, and $C^\beta$ represents the concentration of the PVDF-based resin having crystal form β, the respective proportions of the respective absorbances of crystal form α and crystal form β are expressed as follows:

$$A^\beta/A^\alpha = (\varepsilon^\beta/\varepsilon^\alpha) \times (C^\beta/C^\alpha) \qquad (1a)$$

Assuming that a correction factor ($\varepsilon^\beta/\varepsilon^\alpha$) for the molar extinction coefficient is $E^{\beta/\alpha}$, the content rate $F(\beta) = (C^\beta/(C^\alpha + C^\beta))$ of the PVDF-based resin having crystal form β with respect to the crystal form α and crystal form β combined is expressed by the following formula (2a):

$$F(\beta) = \{(1/E^{\beta/\alpha}) \times (A^\alpha/A^\beta)\}/\{1 + (1/E^{\beta/\alpha}) \times (A^\alpha/A^\beta)\} = \qquad (2a)$$
$$A^\beta/\{(E^{\beta/\alpha} \times A^\alpha) + A^\beta\}$$

Thus, in a case where the correction factor $E^{\beta/\alpha}$ is determined, the content rate F(β) of the PVDF-based resin having crystal form β with respect to the crystal form α and crystal form β combined can be calculated from an actual measurement of the absorbance $A^\alpha$ of the characteristic absorption of crystal form α and an actual measurement of the absorbance $A^\beta$ of the characteristic absorption of crystal form β. Further, the content rate F(α) of the PVDF-based resin having crystal form α with respect to the crystal form α and crystal form β combined can be calculated from F(β) calculated as above.

(ii) Method for Determining Correction Factor $E^{\beta/\alpha}$

A sample of a PVDF-based resin having only crystal form α is mixed with a sample of a PVDF-based resin having only crystal form β for preparation of a sample with a known content rate F(β) of the PVDF-based resin having crystal form β. The IR spectrum of the prepared sample is measured. Then, measurements are made of the absorbance (peak height) $A^\alpha$ of the characteristic absorption of crystal form α and the absorbance (peak height) $A^\beta$ of the characteristic absorption of crystal form β in the IR spectrum measured above.

Subsequently, $A^\alpha$ and $A^\beta$ are substituted into the formula (3a) below, into which the formula (2a) is solved for $E^{\beta/\alpha}$, to determine a correction factor $E^{\beta/\alpha}$.

$$E^{\beta/\alpha} = \{A^\beta \times (1 - F(\beta))\}/(A^\alpha \times F(\beta)) \qquad (3a)$$

Measurements are made of respective IR spectra of a plurality of samples having respective mixing ratios different from each other. The respective correction factors $E^{\beta/\alpha}$ of the plurality of samples are determined by the above method, and the average of the correction factors $E^{\beta/\alpha}$ is then calculated.

(iii) Calculation of Respective Content Rates of Crystal Form α and Crystal Form β in Sample For each sample, the content rate F(α) of the PVDF-based resin having crystal form α with respect to the crystal form α and crystal form β combined is calculated on the basis of the average correction factor $E^{\beta/\alpha}$ calculated in (ii) above and the result of measurement of the IR spectrum of the sample.

Specifically, the content rate F(α) is calculated as follows: A laminated body including the above porous layer is prepared by a preparation method described later. A portion of the laminated body is cut out for preparation of a measurement sample. Then, the infrared absorption spectrum of the measurement sample at wave numbers from 4000 cm$^{-1}$ to 400 cm$^{-1}$ (measurement range) is measured at room temperature (approximately 25° C.) with use of an FT-IR spectrometer (available from Bruker Optics K.K.; model: ALPHA Platinum-ATR) with a resolution of 4 cm$^{-1}$ and 512 times of scanning. The measurement sample cut out is preferably in the shape of an 80 mm×80 mm square. The size and shape of the measurement sample are, however, not limited to that; the measurement sample simply needs to be so sized as to allow its infrared absorption spectrum to be measured. Then, from the spectrum measured, the absorption intensity ($A^{\alpha}$) at 765 cm$^{-1}$ (characteristic absorption of crystal form α) and the absorption intensity ($A^{\beta}$) at 840 cm$^{-1}$ (characteristic absorption of crystal form β) are determined. The starting point and end point of a waveform formed with the wave number set as a peak are connected with a straight line, where the length between the straight line and the peak wave number (peak top) denote an absorption intensity. For crystal form α, a maximum possible absorption intensity within the wave number range of 775 cm$^{-1}$ to 745 cm$^{-1}$ is assumed to be the absorption intensity ($A^{\alpha}$) at 765 cm$^{-1}$. For crystal form β, a maximum possible absorption intensity within the wave number range of 850 cm$^{-1}$ to 815 cm$^{-1}$ is assumed to be the absorption intensity ($A^{\beta}$) at 840 cm$^{-1}$. Note that the content rate F(α) of crystal form α herein is calculated on the assumption of the average correction factor $E^{\beta/\alpha}$ being 1.681 (with reference to Japanese Patent Application Publication, Tokukai, No. 2005-200623). The calculation uses the following formula (4a):

$$F(\alpha)(\%)=[1-\{\text{absorption intensity }(A^{\beta})\text{ at 840 cm}^{-1}/(\text{absorption intensity }(A^{\alpha})\text{ at 765 cm}^{-1}\times\text{correction factor }(E^{\beta/\alpha})\,(1.681)+\text{absorption intensity }(A^{\beta})\text{ at 840 cm}^{-1})\}]\times 100 \quad (4a)$$

<Method for Producing Porous Layer>

The porous layer for an embodiment of the present invention can be produced by, for example, a method similar to a method for producing a laminated body and porous base material for an embodiment of the present invention.

<Method for Producing Porous Layer and Method for Producing Laminated Body>

A porous layer and laminated body for an embodiment of the present invention may each be produced by any production method, and may each be produced by any of various methods.

In an example method, a porous layer containing a PVDF-based resin and optionally a filler is formed, through one of the processes (1) to (3) below, on a surface of a polyolefin-based resin microporous film to be a porous base material. In the case of the process (2) or (3), a porous layer deposited is dried for removal of the solvent. In the processes (1) to (3), the coating solution, in the case of production of a porous layer containing a filler, preferably contains a filler dispersed therein and a PVDF-based resin dissolved therein.

The coating solution for use in a method for producing a porous layer for an embodiment of the present invention can be prepared normally by (i) dissolving, in a solvent, a resin to be contained in the porous layer for an embodiment of the present invention and (ii) dispersing, in the solvent, fine particles to be contained in the porous layer for an embodiment of the present invention.

(1) A process of (i) coating a surface of a porous base material with a coating solution containing fine particles of a PVDF-based resin to be contained in a porous layer and optionally fine particles of a filler and (ii) drying the surface of the porous base material to remove the solvent (dispersion medium) from the coating solution for formation of a porous layer.

(2) A process of (i) coating a surface of a porous base material with a coating solution containing fine particles of a PVDF-based resin to be contained in a porous layer and optionally fine particles of a filler and then (ii) immersing the porous base material into a deposition solvent (which is a poor solvent for the PVDF-based resin) for deposition of a porous layer containing the PVDF-based resin and optionally the filler.

(3) A process of (i) coating a surface of a porous base material with a coating solution containing fine particles of a PVDF-based resin to be contained in a porous layer and optionally fine particles of a filler and then (ii) making the coating solution acidic with use of a low-boiling-point organic acid for deposition of a porous layer containing the PVDF-based resin and optionally the filler.

The solvent (dispersion medium) in the coating solution may be any solvent that does not adversely affect the porous base material, that allows a PVDF-based resin to be dissolved or dispersed therein uniformly and stably, and that allows a filler to be dispersed therein uniformly and stably. Examples of the solvent (dispersion medium) include N-methylpyrrolidone, N,N-dimethylacetamide, N,N-dimethylformamide, acetone, and water.

The deposition solvent can be, for example, another solvent (hereinafter also referred to as "solvent X") that is dissolvable in the solvent (dispersion medium) contained in the coating solution and that does not dissolve the PVDF-based resin contained in the coating solution. The solvent (dispersion medium) can be efficiently removed from the coating solution by (i) immersing, in the solvent X, a porous base material to which the coating solution has been applied and on which a coating film has been formed, for replacement of the solvent (dispersion medium) in the coating film on the porous base material or a support with the solvent X and then (ii) evaporating the solvent X. The deposition solvent is preferably isopropyl alcohol or t-butyl alcohol, for example.

For the process (3), the low-boiling-point organic acid can be, for example, paratoluene sulfonic acid or acetic acid.

The coating solution may be prepared by any method that allows the coating solution to satisfy conditions such as the resin solid content (resin concentration) and the fine-particle amount that are necessary to produce a desired porous layer. Specific examples of the method for preparing a coating solution include a mechanical stirring method, an ultrasonic dispersion method, a high-pressure dispersion method, and a media dispersion method. The fine particles may be dispersed in the solvent (dispersion medium) with use of a conventionally publicly known dispersing device such as a three-one motor, a homogenizer, a media-type dispersing device, or a pressure-type dispersing device. Further, the coating solution may be prepared simultaneously with wet grinding of fine particles by supplying into a wet grinding device a liquid in which a resin is dissolved or swollen or an emulsified liquid of a resin during wet grinding carried out to produce fine particles having a desired average particle diameter. In other words, the wet grinding of fine particles and the preparation of a coating solution may be carried out simultaneously in a single step. The coating solution may contain an additive(s) such as a dispersing agent, a plasticizing agent, a surface active agent, and a pH adjusting agent as a component(s) other than the resin and the fine particles as long as such an additive does not prevent an object of the present invention from being attained. The additive may be added in an amount that does not prevent an object of the present invention from being attained.

The coating solution may be applied to the porous base material by any method, that is, a porous layer may be formed by any method on a surface of a porous base material that may have been subjected to a hydrophilization treatment as necessary. In a case where a porous layer is disposed on each of both surfaces of the porous base material, (i) a sequential deposition method may be used, in which a porous layer is formed on one surface of the porous base material, and another porous layer is subsequently formed on the other surface of the porous base material, or (ii) a simultaneous deposition method may be used, in which porous layers are formed simultaneously on both surfaces of the porous base material. A porous layer can be formed (that is, a laminated body can be produced) by, for example, (i) a method of applying the coating solution directly to a surface of the porous base material and then removing the solvent (dispersion medium), (ii) a method of applying the coating solution to an appropriate support, removing the solvent (dispersion medium) for formation of a porous layer, then pressure-bonding the porous layer to the porous base material, and peeling the support off, (iii) a method of applying the coating solution to a surface of an appropriate support, then pressure-bonding the porous base material to that surface, then peeling the support off, and then removing the solvent (dispersion medium), or (iv) a method of immersing the porous base material into the coating solution for dip coating and then removing the solvent (dispersion medium). The thickness of the porous layer can be controlled by adjusting, for example, the thickness of the coating film in a wet state (wet) after the coating, the weight ratio between the resin and the fine particles, and the solid content concentration (that is, the sum of the resin concentration and the fine-particle concentration) of the coating solution. The support can be, for example, a resin film, a metal belt, or a drum.

The coating solution may be applied to the porous base material or support by any method that can achieve a necessary weight per unit area and a necessary coating area. The coating solution can be applied by a conventionally publicly known method. Specific examples include a gravure coater method, a small-diameter gravure coater method, a reverse roll coater method, a transfer roll coater method, a kiss coater method, a dip coater method, a knife coater method, an air doctor blade coater method, a blade coater method, a rod coater method, a squeeze coater method, a cast coater method, a bar coater method, a die coater method, a screen printing method, and a spray coating method.

The solvent (dispersion medium) is typically removed by a drying method. Examples of the drying method include natural drying, air-blow drying, heat drying, and drying under reduced pressure. The solvent (dispersion medium) can, however, be removed by any method that allows the solvent (dispersion medium) to be removed sufficiently. The solvent (dispersion medium) contained in the coating solution may be replaced with another solvent before a drying operation. The solvent (dispersion medium) can be replaced with another solvent for removal by, for example, a method of (i) preparing another solvent (hereinafter referred to as "solvent X") that is dissolvable in the solvent (dispersion medium) contained in the coating solution and that does not dissolve the resin contained in the coating solution, (ii) immersing the porous base material or support, to which the coating solution has been applied and on which a coating film has been formed, into the solvent X to replace the solvent (disperse medium) in the coating film on the porous base material or support with the solvent X, and (iii) evaporating the solvent X. This method allows the solvent (dispersion medium) to be removed efficiently from the coating solution. In a case where the coating film, formed on the porous base material or support by applying the coating solution thereto, is heated when removing the solvent (dispersion medium) or solvent X from the coating film, the coating film is desirably heated at a temperature that does not decrease the air permeability of the porous base material, specifically within a range of 10° C. to 120° C., preferably within a range of 20° C. to 80° C., to prevent pores in the porous base material from contracting to decrease the air permeability of the porous base material.

The solvent (dispersion medium) is preferably removed by, in particular, a method of applying the coating solution to a base material and then drying the base material for formation of a porous layer. This arrangement makes it possible to produce a porous layer having a smaller porosity variation and fewer wrinkles.

The above drying can be carried out with the use of a normal drying device.

The porous layer normally has, on one surface of the porous base material, an applied amount (weight per unit area) within a range of preferably 0.5 g/m$^2$ to 20 g/m$^2$, more preferably 0.5 g/m$^2$ to 10 g/m$^2$, preferably 0.5 g/m$^2$ to 1.5 g/m$^2$, in terms of the solid content in view of adhesiveness to an electrode and ion permeability. This means that the amount of the coating solution to be applied to the porous base material is preferably adjusted so that the porous layer in a laminated body or porous base material to be produced has an applied amount (weight per unit area) within the above range.

In a case where an additional layer such as a heat-resistant layer is to be disposed on the laminated body, such a heat-resistant layer can be disposed by a method similar to the above method except that the resin for the porous layer is replaced with a resin for the heat-resistant layer.

The present embodiment is arranged such that in any of the processes (1) to (3), changing the amount of resin for a porous layer which resin is to be dissolved or dispersed in a solution can adjust the volume of resin that is contained per square meter of a porous layer having undergone immersion in an electrolyte and that has absorbed the electrolyte.

Further, changing the amount of solvent in which the resin for the porous layer is to be dissolved or dispersed can adjust the porosity and average pore diameter of a porous layer having undergone immersion in an electrolyte.

<Method for Controlling Crystal Forms of PVDF-Based Resin>

A laminated body of an embodiment of the present invention is produced while adjustment is made of the drying conditions (for example, the drying temperature, and the air velocity and direction during drying) and/or the deposition temperature (that is, the temperature at which a porous layer containing a PVDF-based resin is deposited with use of a deposition solvent or a low-boiling-point organic acid) for the above-described method to control the crystal forms of the PVDF-based resin to be contained in a porous layer to be formed. Specifically, a laminated body of an embodiment of the present invention can be produced while the drying conditions and the deposition temperature are adjusted so that the PVDF-based resin contains crystal form α in an amount of not less than 36 mol % (preferably not less than 39 mol %, more preferably not less than 40 mol %, more preferably not less than 50 mol %, more preferably not less than 60 mol %, further preferably not less than 70 mol %; preferably not more than 95 mol %) with respect to 100 mol % of the total amount of the crystal form α and crystal form β contained.

The drying conditions and the deposition temperature, which are adjusted so that the PVDF-based resin contains crystal form α in an amount of not less than 36 mol % with respect to 100 mol % of the total amount of the crystal form α and crystal form β contained, may be changed as appropriate in correspondence with, for example, the method for producing a porous layer, the kind of solvent (dispersion medium) to be used, the kind of deposition solvent to be used, and/or the kind of low-boiling-point organic acid to be used.

In a case where a deposition solvent is not used and the coating solution is simply dried as in the process (1), the drying conditions may be changed as appropriate in correspondence with, for example, the amount of the solvent in the coating solution, the concentration of the PVDF-based resin in the coating solution, the amount of the filler (if contained), and/or the amount of the coating solution to be applied. In a case where a porous layer is to be formed through the process (1) described above, it is preferable that the drying temperature be 30° C. to 100° C., that the direction of hot air for drying be perpendicular to a porous base material or electrode sheet to which the coating solution has been applied, and that the velocity of the hot air be 0.1 m/s to 40 m/s. Specifically, in a case where a coating solution to be applied contains N-methyl-2-pyrrolidone as the solvent for dissolving a PVDF-based resin, 1.0% by mass of a PVDF-based resin, and 9.0% by mass of alumina as an inorganic filler, the drying conditions are preferably adjusted so that the drying temperature is 40° C. to 100° C., that the direction of hot air for drying is perpendicular to a porous base material or electrode sheet to which the coating solution has been applied, and that the velocity of the hot air is 0.4 m/s to 40 m/s.

In a case where a porous layer is to be formed through the process (2) described above, it is preferable that the deposition temperature be −25° C. to 60° C. and that the drying temperature be 20° C. to 100° C. Specifically, in a case where a porous layer is to be formed through the above-described process (2) with use of N-methylpyrrolidone as the solvent for dissolving a PVDF-based resin and isopropyl alcohol as the deposition solvent, it is preferable that the deposition temperature be −10° C. to 40° C. and that the drying temperature be 30° C. to 80° C.

[2. Nonaqueous Electrolyte Secondary Battery Member and nonaqueous Electrolyte Secondary Battery]

A nonaqueous electrolyte secondary battery member in accordance with an embodiment of the present invention includes a cathode, a laminated body, and an anode that are arranged in this order. A nonaqueous electrolyte secondary battery in accordance with an embodiment of the present invention includes a laminated body as a separator. The description below deals with (i) a lithium-ion secondary battery member as an example of a nonaqueous electrolyte secondary battery member and (ii) a lithium-ion secondary battery as an example of the nonaqueous electrolyte secondary battery. The components of the nonaqueous electrolyte secondary battery member and nonaqueous electrolyte secondary battery other than the above laminated body are not limited to those described below.

A nonaqueous electrolyte secondary battery in accordance with an embodiment of the present invention can include a nonaqueous electrolyte containing, for example, an organic solvent and a lithium salt dissolved therein. Examples of the lithium salt include $LiClO_4$, $LiPF_6$, $LiAsF_6$, $LiSbF_6$, $LiBF_4$, $LiCF_3SO_3$, $LiN(CF_3SO_2)_2$, $LiC(CF_3SO_2)_3$, $Li_2B_{10}Cl_{10}$, lower aliphatic carboxylic acid lithium salt, and $LiAlCl_4$. The present embodiment may use only one kind of the above lithium salts or two or more kinds of the above lithium salts in combination. It is preferable to use, among the above lithium salts, at least one fluorine-containing lithium salt selected from the group consisting of $LiPF_6$, $LiAsF_6$, $LiSbF_6$, $LiBF_4$, $LiCF_3SO_3$, $LiN(CF_3SO_2)_2$, and $LiC(CF_3SO_2)_3$.

Specific examples of the organic solvent in the nonaqueous electrolyte include carbonates such as ethylene carbonate, propylene carbonate, dimethyl carbonate, diethyl carbonate, ethyl methyl carbonate, 4-trifluoromethyl-1,3-dioxolane-2-one, and 1,2-di(methoxy carbonyloxy)ethane; ethers such as 1,2-dimethoxyethane, 1,3-dimethoxypropane, pentafluoropropyl methylether, 2,2,3,3-tetrafluoropropyl difluoro methylether, tetrahydrofuran, and 2-methyl tetrahydrofuran; esters such as methyl formate, methyl acetate, and γ-butyrolactone; nitriles such as acetonitrile and butyronitrile; amides such as N,N-dimethylformamide and N,N-dimethylacetamide; carbamates such as 3-methyl-2-oxazolidone; sulfur-containing compounds such as sulfolane, dimethyl sulfoxide, and 1,3-propane sultone; and fluorine-containing organic solvents prepared by introducing a fluorine group into the organic solvents described above. The present embodiment may use only one kind of the above organic solvents or two or more kinds of the above organic solvents in combination. Among the above organic solvents, carbonates are preferable. A mixed solvent of a cyclic carbonate and an acyclic carbonate or a mixed solvent of a cyclic carbonate and an ether is further preferable. The mixed solvent of a cyclic carbonate and an acyclic carbonate is further preferably a mixed solvent of ethylene carbonate, dimethyl carbonate, and ethyl methyl carbonate because such a mixed solvent allows a wider operating temperature range, and is not easily decomposed even in a case where the present embodiment uses, as an anode active material, a graphite material such as natural graphite or artificial graphite.

The cathode is normally a sheet-shaped cathode including (i) a cathode mix containing a cathode active material, an electrically conductive material, and a binder and (ii) a cathode current collector supporting the cathode mix thereon.

The cathode active material is, for example, a material capable of being doped and dedoped with lithium ions. Specific examples of such a material include a lithium complex oxide containing at least one transition metal such as V, Mn, Fe, Co, or Ni. Among such lithium complex oxides, (i) a lithium complex oxide having an α-$NaFeO_2$ structure such as lithium nickelate and lithium cobaltate and (ii) a lithium complex oxide having a spinel structure such as lithium manganese spinel are preferable because such lithium complex oxides have a high average discharge potential. The lithium complex oxide may further contain any of various metallic elements, and is further preferably complex lithium nickelate. Further, the complex lithium nickelate particularly preferably contains at least one metallic element selected from the group consisting of Ti, Zr, Ce, Y, V, Cr, Mn, Fe, Co, Cu, Ag, Mg, Al, Ga, In, and Sn at a proportion of 0.1 mol % to 20 mol % with respect to the sum of the number of moles of the at least one metallic element and the number of moles of Ni in the lithium nickelate. This is because such a complex lithium nickelate allows an excellent cycle characteristic for use in a high-capacity battery. Among others, an active material that contains Al or Mn and that contains Ni at a proportion of not less than 85%, further preferably not less than 90%, is particularly preferable because a nonaqueous electrolyte secondary battery including a cathode containing the above active material has an excellent in cycle characteristic for use as a high-capacity battery.

Examples of the electrically conductive material include carbonaceous materials such as natural graphite, artificial graphite, cokes, carbon black, pyrolytic carbons, carbon fiber, and a fired product of an organic polymer compound. The present embodiment may use (i) only one kind of the above electrically conductive materials or (ii) two or more kinds of the above electrically conductive materials in combination, for example a mixture of artificial graphite and carbon black.

Examples of the binder include thermoplastic resins such as polyvinylidene fluoride, a copolymer of vinylidene fluoride, polytetrafluoroethylene, a tetrafluoroethylene-hexafluoropropylene copolymer, a tetrafluoroethylene-perfluoroalkyl vinyl ether copolymer, an ethylene-tetrafluoroethylene copolymer, a vinylidene fluoride-hexafluoropropylene-tetrafluoroethylene copolymer, a thermoplastic polyimide, polyethylene, and polypropylene; an acrylic resin; and styrene-butadiene rubber. The binder functions also as a thickening agent.

The cathode mix may be prepared by, for example, a method of applying pressure to the cathode active material, the electrically conductive material, and the binder on the cathode current collector or a method of using an appropriate organic solvent so that the cathode active material, the electrically conductive material, and the binder are in a paste form.

Examples of the cathode current collector include electric conductors such as Al, Ni, and stainless steel. Among these, Al is preferable as it is easy to process into a thin film and less expensive.

The sheet-shaped cathode may be produced, that is, the cathode mix may be supported by the cathode current collector, through, for example, a method of applying pressure to the cathode active material, the electrically conductive material, and the binder on the cathode current collector to form a cathode mix thereon or a method of (i) using an appropriate organic solvent so that the cathode active material, the electrically conductive material, and the binder are in a paste form to provide a cathode mix, (ii) applying the cathode mix to the cathode current collector, (iii) drying the applied cathode mix to prepare a sheet-shaped cathode mix, and (iv) applying pressure to the sheet-shaped cathode mix so that the sheet-shaped cathode mix is firmly fixed to the cathode current collector.

The anode is normally a sheet-shaped anode including (i) an anode mix containing an anode active material and (ii) an anode current collector supporting the anode mix thereon. The sheet-shaped anode preferably contains the above electrically conductive material and binder.

The anode active material is, for example, (i) a material capable of being doped and dedoped with lithium ions, (ii) a lithium metal, or (iii) a lithium alloy. Specific examples of the material include carbonaceous materials such as natural graphite, artificial graphite, cokes, carbon black, pyrolytic carbons, carbon fiber, and a fired product of an organic polymer compound; chalcogen compounds such as an oxide and a sulfide that are doped and dedoped with lithium ions at an electric potential lower than that for the cathode; metals such as aluminum (Al), lead (Pb), tin (Sn), bismuth (Bi), or silicon (Si), each of which is alloyed with alkali metal; an intermetallic compound (AlSb, $Mg_2Si$, $NiSi_2$) of a cubic system in which intermetallic compound alkali metal can be inserted in voids in a lattice; and a lithium nitrogen compound ($Li_3-xM_xN$ (where M represents a transition metal)). Among the above anode active materials, a carbonaceous material containing a graphite material such as natural graphite or artificial graphite as a main component is preferable, an anode active material which is a mixture of graphite and silicon and in which the ratio of Si to C is not less than 5% is more preferable, and an anode active material in which the ratio of Si to C is not less than 10% is further preferable. This is because such a carbonaceous material has high electric potential flatness and low average discharge potential and can thus be combined with a cathode to achieve high energy density.

The anode mix may be prepared by, for example, a method of applying pressure to the anode active material on the anode current collector or a method of using an appropriate organic solvent so that the anode active material is in a paste form.

The anode current collector is, for example, Cu, Ni, or stainless steel. Among these, Cu is preferable as it is not easily alloyed with lithium in the case of a lithium-ion secondary battery in particular and is easily processed into a thin film.

The sheet-shaped anode may be produced, that is, the anode mix may be supported by the anode current collector, through, for example, a method of applying pressure to the anode active material on the anode current collector to form an anode mix thereon or a method of (i) using an appropriate organic solvent so that the anode active material is in a paste form to provide an anode mix, (ii) applying the anode mix to the anode current collector, (iii) drying the applied anode mix to prepare a sheet-shaped anode mix, and (iv) applying pressure to the sheet-shaped anode mix so that the sheet-shaped anode mix is firmly fixed to the anode current collector. The above paste preferably includes a conductive aid and binder.

A nonaqueous electrolyte secondary battery in accordance with an embodiment of the present invention may be produced by (i) arranging the cathode, the laminated body, and the anode in this order so as to form a nonaqueous electrolyte secondary battery member in accordance with an embodiment of the present invention, (ii) inserting the nonaqueous electrolyte secondary battery member into a container that is for use as a housing of the nonaqueous electrolyte secondary battery, (iii) filling the container with a nonaqueous electrolyte, and (iv) hermetically sealing the container under reduced pressure. The nonaqueous electrolyte secondary battery may have any shape such as the shape of a thin plate (sheet), a disk, a cylinder, or a prism such as a cuboid. The nonaqueous electrolyte secondary battery may be produced by any method, and may be produced by a conventionally publicly known method.

EXAMPLES

<Method for Measuring Various Physical Properties of Porous Base Material>

Various physical properties of porous base materials in accordance with Production Examples and Comparative Examples below were measured by the following methods:

(1) Temperature Rise Ending Period at Microwave Irradiation

An 8 cm×8 cm test piece was cut out from a porous base material, and the weight W (g) of the test piece was measured. Then, the weight per unit area of the test piece was calculated in accordance with the following formula:

Weight per unit area $(g/m^2) = W/(0.08 \times 0.08)$.

Next, the test piece was impregnated with N-methylpyrrolidone (NMP) to which 3% by weight of water had been added. Then, the test piece was placed on a Teflon (registered trademark) sheet (12 cm×10 cm). The test piece was folded in half in such a manner as to sandwich an optical fiber thermometer (available from ASTEC Co., Ltd., Neoptix Reflex thermometer) coated with polytetrafluoroethylene (PTFE).

Next, the test piece, which had been impregnated with NMP containing water and had been so folded as to sandwich the thermometer, was fixed in a microwave irradiation device (available from Micro Denshi Co., Ltd., 9-kW microwave oven; frequency: 2455 MHz) equipped with a turntable. The test piece was then irradiated with a microwave at 1800 W for 2 minutes.

The optical fiber thermometer was used to measure, every 0.2 seconds, changes in the temperature of the test piece after the start of the microwave irradiation. In the temperature measurements, the temperature at which no temperature rise was measured for not less than 1 second was used as a temperature rise ending temperature, and the time period that elapsed before the temperature rise ending temperature was reached after the start of the microwave irradiation was used as a temperature rise ending period. The temperature rise ending period was divided by the above weight per unit area for calculation of a temperature rise ending period with respect to the amount of resin per unit area.

(2) Initial Rate Characteristic

Nonaqueous electrolyte secondary batteries each assembled as described later were each subjected to four cycles of initial charge and discharge. Each of the four cycles of the initial charge and discharge was carried out at 25° C., at a voltage ranging from 4.1 V to 2.7 V, and at an electric current value of 0.2 C. Note that the value of an electric current at which a battery rated capacity defined as a one-hour rate discharge capacity was discharged in one hour was assumed to be 1 C. This applies also to the following descriptions.

Each nonaqueous electrolyte secondary battery that had been subjected to initial charge and discharge was subjected to three cycles of charge and discharge at a constant charge electric current value of 1 C and a constant discharge electric current value of 0.2 C at 55° C., and was also subjected to another three cycles of charge and discharge at a constant charge electric current value of 1 C and a constant discharge electric current value of 20 C at 55° C. The ratio (20 C discharge capacity/0.2 C discharge capacity) of (i) the discharge capacity in the third cycle at the discharge electric current value of 20 C to (ii) the discharge capacity in the third cycle at the discharge electric current value of 0.2 C was calculated as the initial rate characteristic.

(3) Ratio of Maintenance of Rate Characteristic through Charge and Discharge Cycle The nonaqueous electrolyte secondary batteries, which had been subjected to the measurement of the initial rate characteristic, were each subjected to charge and discharge in which 100 cycles of charge and discharge were carried out. Each of the 100 cycles of the charge and discharge was carried out at 55° C., at a voltage ranging from 4.2 V to 2.7 V, and at a constant charge electric current value of 1 C and a constant discharge electric current value of 10 C.

Each nonaqueous electrolyte secondary battery, which had been subjected to 100 cycles of charge and discharge, was subjected to three cycles of charge and discharge at a constant charge electric current value of 1 C and a constant discharge electric current value of 0.2 C at 55° C., and was also subjected to another three cycles of charge and discharge at a constant charge electric current value of 1 C and a constant discharge electric current value of 20 C at 55° C. The ratio (20 C discharge capacity/0.2 C discharge capacity) of (i) the discharge capacity in the third cycle at the discharge electric current value of 20 C to (ii) the discharge capacity in the third cycle at the discharge electric current value of 0.2 C was calculated as a rate characteristic after 100 cycles of charge and discharge (rate characteristic after 100 cycles).

On the basis of the results of the above rate characteristic tests, the ratio (%) of maintenance of the rate characteristic through a charge and discharge cycle in accordance with the following formula:

Ratio of maintenance of rate characteristic=(rate characteristic after 100 cycles)/(initial rate characteristic)×100

<Preparation of Porous Base Material>

Porous films in accordance with Production Examples 1 to 4 and Comparative Examples 2 and 3 were prepared as described below for use as porous base materials.

Production Example 1

First, 68% by weight of ultra-high molecular weight polyethylene powder (GUR2024, available from Ticona Corporation; weight-average molecular weight: 4,970,000) and 32% by weight of polyethylene wax (FNP-0115; available from Nippon Seiro Co., Ltd.) having a weight-average molecular weight of 1000 were prepared, that is, 100 parts by weight in total of the ultra-high molecular weight polyethylene and the polyethylene wax were prepared. Then, 0.4% by weight of an antioxidant (Irg1010, available from Ciba Specialty Chemicals), 0.1% by weight of an antioxidant (P168, available from Ciba Specialty Chemicals), and 1.3% by weight of sodium stearate were added to the ultra-high molecular weight polyethylene and the polyethylene wax, and then calcium carbonate (available from Maruo Calcium Co., Ltd.) having an average pore diameter of 0.1 μm was further added by 38% by volume with respect to the total volume of the above ingredients. Then, the ingredients were mixed in powder form with use of a Henschel mixer, and were then melted and kneaded with use of a twin screw kneading extruder. This produced a polyolefin resin composition. Then, the polyolefin resin composition was rolled with use of a pair of rollers each having a surface temperature of 150° C. into a sheet. This sheet was immersed in an aqueous hydrochloric acid solution (containing 4 mol/L of hydrochloric acid and 0.5% by weight of nonionic surfactant) for removal of the calcium carbonate, and was then stretched 6.2-fold at 100° C. to 105° C. at a straining rate of 1250% per minute. This prepared a film having a thickness of 10.9 μm. This film was then subjected to a heat-fixation treatment at 126° C. This produced a porous base material of Production Example 1.

Production Example 2

First, 70% by weight of ultra-high molecular weight polyethylene powder (GUR4032, available from Ticona Corporation; weight-average molecular weight: 4,970,000) and 30% by weight of polyethylene wax (FNP-0115; available from Nippon Seiro Co., Ltd.) having a weight-average molecular weight of 1000 were prepared, that is, 100 parts by weight in total of the ultra-high molecular weight polyethylene and the polyethylene wax were prepared. Then, 0.4% by weight of an antioxidant (Irg1010, available from Ciba Specialty Chemicals), 0.1% by weight of an antioxidant (P168, available from Ciba Specialty Chemicals), and 1.3% by weight of sodium stearate were added to the ultra-high molecular weight polyethylene and the polyethylene wax, and then calcium carbonate (available from Maruo Calcium Co., Ltd.) having an average pore diameter of 0.1 μm was further added by 36% by volume with respect to the total volume of the above ingredients. Then, the ingredients were mixed in powder form with use of a Henschel mixer, and were then melted and kneaded with use of a twin screw kneading extruder. This produced a polyolefin resin composition. Then, the polyolefin resin composition was rolled with use of a pair of rollers each having a surface temperature of 150° C. into a sheet. This sheet was immersed in an aqueous hydrochloric acid solution (containing 4 mol/L of hydrochloric acid and 0.5% by weight of nonionic surfactant) for removal of the calcium carbonate, and was then stretched 6.2-fold at 100° C. to 105° C. at a straining rate of 1250% per minute. This prepared a film having a thickness of 15.5 μm. This film was then subjected to a heat-fixation treatment at 120° C. This produced a porous base material of Production Example 2.

Production Example 3

First, 71% by weight of ultra-high molecular weight polyethylene powder (GUR4032, available from Ticona Corporation; weight-average molecular weight: 4,970,000) and 29% by weight of polyethylene wax (FNP-0115; available from Nippon Seiro Co., Ltd.) having a weight-average molecular weight of 1000 were prepared, that is, 100 parts by weight in total of the ultra-high molecular weight polyethylene and the polyethylene wax were prepared. Then, 0.4% by weight of an antioxidant (Irg1010, available from Ciba Specialty Chemicals), 0.1% by weight of an antioxidant (P168, available from Ciba Specialty Chemicals), and 1.3% by weight of sodium stearate were added to the ultra-high molecular weight polyethylene and the polyethylene wax, and then calcium carbonate (available from Maruo Calcium Co., Ltd.) having an average pore diameter of 0.1 μm was further added by 37% by volume with respect to the total volume of the above ingredients. Then, the ingredients were mixed in powder form with use of a Henschel mixer, and were then melted and kneaded with use of a twin screw kneading extruder. This produced a polyolefin resin composition. Then, the polyolefin resin composition was rolled with use of a pair of rollers each having a surface temperature of 150° C. into a sheet. This sheet was immersed in an aqueous hydrochloric acid solution (containing 4 mol/L of hydrochloric acid and 0.5% by weight of nonionic surfactant) for removal of the calcium carbonate, and was then stretched 7.0-fold at 100° C. to 105° C. at a straining rate of 2100% per minute. This prepared a film having a thickness of 11.7 μm. This film was then subjected to a heat-fixation treatment at 123° C. This produced a porous base material of Production Example 3.

Production Example 4

First, 70% by weight of ultra-high molecular weight polyethylene powder (GUR4032, available from Ticona Corporation; weight-average molecular weight: 4,970,000) and 30% by weight of polyethylene wax (FNP-0115; available from Nippon Seiro Co., Ltd.) having a weight-average molecular weight of 1000 were prepared, that is, 100 parts by weight in total of the ultra-high molecular weight polyethylene and the polyethylene wax were prepared. Then, 0.4% by weight of an antioxidant (Irg1010, available from Ciba Specialty Chemicals), 0.1% by weight of an antioxidant (P168, available from Ciba Specialty Chemicals), and 1.3% by weight of sodium stearate were added to the ultra-high molecular weight polyethylene and the polyethylene wax, and then calcium carbonate (available from Maruo Calcium Co., Ltd.) having an average pore diameter of 0.1 μm was further added by 36% by volume with respect to the total volume of the above ingredients. Then, the ingredients were mixed in powder form with use of a Henschel mixer, and were then melted and kneaded with use of a twin screw kneading extruder. This produced a polyolefin resin composition. Then, the polyolefin resin composition was rolled with use of a pair of rollers each having a surface temperature of 150° C. into a sheet. This sheet was immersed in an aqueous hydrochloric acid solution (containing 4 mol/L of hydrochloric acid and 0.5% by weight of nonionic surfactant) for removal of the calcium carbonate, and was then stretched 6.2-fold at 100° C. to 105° C. at a straining rate of 750% per minute. This prepared a film having a thickness of 16.3 μm. This film was then subjected to heat fixation at 115° C. This produced a porous base material of Production Example 4.

Comparative Example 1

A commercially available polyolefin porous film (olefin separator) was used as a porous base material of Comparative Example 1.

Comparative Example 2

First, 70% by weight of ultra-high molecular weight polyethylene powder (GUR4032, available from Ticona Corporation; weight-average molecular weight: 4,970,000) and 30% by weight of polyethylene wax (FNP-0115; available from Nippon Seiro Co., Ltd.) having a weight-average molecular weight of 1000 were prepared, that is, 100 parts by weight in total of the ultra-high molecular weight polyethylene and the polyethylene wax were prepared. Then, 0.4% by weight of an antioxidant (Irg1010, available from Ciba Specialty Chemicals), 0.1% by weight of an antioxidant (P168, available from Ciba Specialty Chemicals), and 1.3% by weight of sodium stearate were added to the ultra-high molecular weight polyethylene and the polyethylene wax, and then calcium carbonate (available from Maruo Calcium Co., Ltd.) having an average pore diameter of 0.1 μm was further added by 36% by volume with respect to the total volume of the above ingredients. Then, the ingredients were mixed in powder form with use of a Henschel mixer, and were then melted and kneaded with use of a twin screw kneading extruder. This produced a polyolefin resin composition. Then, the polyolefin resin composition was rolled with use of a pair of rollers each having a surface temperature of 150° C. into a sheet. This sheet was immersed in an aqueous hydrochloric acid solution (containing 4 mol/L of hydrochloric acid and 0.5% by weight of nonionic surfactant) for removal of the calcium carbonate, and was then stretched 6.2-fold at 100° C. to 105° C. at a straining rate of 2000% per minute. This prepared a film having a thickness of 16.3 μm. This film was then subjected to heat fixation at 123° C. This produced a porous base material of Comparative Example 2.

Comparative Example 3

First, 71% by weight of ultra-high molecular weight polyethylene powder (GUR4032, available from Ticona Corporation; weight-average molecular weight: 4,970,000) and 29% by weight of polyethylene wax (FNP-0115; available from Nippon Seiro Co., Ltd.) having a weight-average molecular weight of 1000 were prepared, that is, 100 parts by weight in total of the ultra-high molecular weight polyethylene and the polyethylene wax were prepared. Then, 0.4% by weight of an antioxidant (Irg1010, available from Ciba Specialty Chemicals), 0.1% by weight of an antioxidant (P168, available from Ciba Specialty Chemicals), and 1.3% by weight of sodium stearate were added to the ultra-high molecular weight polyethylene and the polyethylene wax, and then calcium carbonate (available from Maruo Calcium Co., Ltd.) having an average pore diameter of 0.1 μm was further added by 37% by volume with respect to the total volume of the above ingredients. Then, the ingredients were mixed in powder form with use of a Henschel mixer, and were then melted and kneaded with use of a twin screw kneading extruder. This produced a polyolefin resin composition. Then, the polyolefin resin composition was rolled with use of a pair of rollers each having a surface temperature of 150° C. into a sheet. This sheet was immersed in an aqueous hydrochloric acid solution (containing 4 mol/L of hydrochloric acid and 0.5% by weight of nonionic surfactant) for removal of the calcium carbonate, and was then stretched 7.1-fold at 100° C. to 105° C. at a straining rate of 750% per minute. This prepared a film having a thickness of 11.5 μm. This film was then subjected to heat fixation at 128° C. This produced a porous base material of Comparative Example 3.

Table 1 below shows the stretch straining rate, the film thickness after stretching, the heat-fixation temperature, and the heat-fixation temperature/film thickness after stretching (that is, heat-fixation temperature per unit thickness of the stretched film) of each of Production Examples 1 to 4 and Comparative Examples 2 and 3.

TABLE 1

|  | Stretch straining rate [%/min] | Film thickness after stretching [μm] | Heat-fixation temperature [° C.] | Heat-fixation temperature/film thickness after stretching [° C./μm] |
| --- | --- | --- | --- | --- |
| PE 1 | 1250 | 10.9 | 126 | 11.6 |
| PE 2 | 1250 | 15.5 | 120 | 7.7 |
| PE 3 | 2100 | 11.7 | 123 | 10.5 |
| PE 4 | 750 | 16.3 | 115 | 7.1 |
| CE 2 | 2000 | 16.3 | 123 | 7.5 |
| CE 3 | 750 | 11.5 | 128 | 11.1 |

"PE" stands for Production Example
"CE" stands for Comparative Example

<Preparation of Nonaqueous Electrolyte Secondary Battery>

Next, nonaqueous electrolyte secondary batteries were prepared as below that included the respective porous base materials prepared as above in Production Examples 1 to 4 and Comparative Examples 1 to 3.

(Cathode)

A commercially available cathode was used that was produced by applying $LiNi_{0.5}Mn_{0.3}Co_{0.2}O_2$/electrically conductive material/PVDF (weight ratio 92:5:3) to an aluminum foil. The aluminum foil was partially cut off so that a cathode active material layer was present in an area of 45 mm×30 mm and that that area was surrounded by an area with a width of 13 mm in which area no cathode active material layer was present. The cutoff was used as a cathode. The cathode active material layer had a thickness of 58 μm and a density of 2.50 g/cm$^3$. The cathode had a capacity of 174 mAh/g.

(Anode)

A commercially available anode was used that was produced by applying graphite/styrene-1,3-butadiene copolymer/sodium carboxymethylcellulose (weight ratio 98:1:1) to a copper foil. The copper foil was partially cut off so that an anode active material layer was present in an area of 50 mm×35 mm and that that area was surrounded by an area with a width of 13 mm in which area no anode active material layer was present. The cutoff was used as an anode. The anode active material layer had a thickness of 49 μm and a density of 1.40 g/cm$^3$. The anode had a capacity of 372 mAh/g.

(Assembly)

In a laminate pouch, the cathode, the porous base material, and the anode were laminated (arranged) in this order so as to obtain a nonaqueous electrolyte secondary battery member. During this operation, the cathode and the anode were arranged so that the cathode active material layer of the cathode had a main surface that was entirely covered by the main surface of the anode active material layer of the anode.

Subsequently, the nonaqueous electrolyte secondary battery member was put into a bag made of a laminate of an aluminum layer and a heat seal layer. Further, 0.25 mL of nonaqueous electrolyte was put into the bag. The nonaqueous electrolyte was an electrolyte at 25° C. prepared by dissolving $LiPF_6$ with a concentration of 1.0 mole per liter in a mixed solvent of ethyl methyl carbonate, diethyl carbonate, and ethylene carbonate in a volume ratio of 50:20:30. The bag was then heat-sealed while the pressure inside the bag was reduced. This produced a nonaqueous electrolyte secondary battery. The nonaqueous electrolyte secondary battery had a design capacity of 20.5 mAh.

<Results of Measurement of Various Physical Properties>

Table 2 shows the results of measuring various physical properties of each of the porous base materials of Production Examples 1 to 4 and Comparative Examples 1 to 3.

TABLE 2

|  | Weight per unit area (g/cm$^2$) | Temperature rise ending period (sec) | Temperature rise ending period/weight per unit area (sec · m$^2$/g) | Initial rate characteristic | Rate characteristic after 100 cycles | Ratio of maintenance of rate characteristic (%) |
| --- | --- | --- | --- | --- | --- | --- |
| PE 1 | 6.4 | 19.8 | 3.09 | 0.597 | 0.374 | 63 |
| PE 2 | 6.9 | 20.6 | 2.99 | 0.771 | 0.523 | 68 |
| PE 3 | 5.4 | 28.4 | 5.26 | 0.784 | 0.555 | 71 |

TABLE 2-continued

| | Weight per unit area (g/cm²) | Temperature rise ending period (sec) | Temperature rise ending period/weight per unit area (sec · m²/g) | Initial rate characteristic | Rate characteristic after 100 cycles | Ratio of maintenance of rate characteristic (%) |
|---|---|---|---|---|---|---|
| PE 4 | 5.3 | 29.8 | 5.62 | 0.840 | 0.493 | 59 |
| CE 1 | 13.9 | 26.6 | 1.91 | 0.482 | 0.177 | 37 |
| CE 2 | 9.6 | 25.8 | 2.69 | 0.141 | 0.127 | 90 |
| CE 3 | 6.2 | 17.8 | 2.88 | 0.691 | 0.358 | 52 |

"PE" stands for Production Example
"CE" stands for Comparative Example

Table 2 shows that the respective porous base materials of Production Examples 1 to 4, in each of which the temperature rise ending period with respect to the amount of resin per unit area (weight per unit area) was 2.9 seconds·m²/g to 5.7 seconds·m²/g, each had an excellent initial rate characteristic and a smaller decrease in the rate of maintenance of the rate characteristic. This indicates that the respective porous base materials of Production Examples 1 to 4 were superior to those of Comparative Examples 1 to 3, in each of which the temperature rise ending period with respect to the weight per unit area was outside the range of 2.9 seconds·m²/g to 5.7 seconds·m²/g.

[Various Methods for Measuring Physical Properties of Laminated Body]

In the Examples and Comparative Examples below, properties such as the α rate and curl property were measured by the following methods:

(1) Method for Calculating α Rate

An α rate (%) was measured by the method below, the α rate (%) being a molar ratio (%) of crystal form α in the PVDF-based resin contained in the porous layer in the laminated body produced in each of the Examples and Comparative Examples below with respect to the total amount of the crystal form α and crystal form β contained in the PVDF-based resin.

An 80 mm×80 mm square was cut out from the laminated body. The infrared absorption spectrum of the cutout at wave numbers from 4000 cm⁻¹ to 400 cm⁻¹ (measurement range) was measured at room temperature (approximately 25° C.) with use of an FT-IR spectrometer (available from Bruker Optics K.K.; model: ALPHA Platinum-ATR) with a resolution of 4 cm⁻¹ and 512 times of scanning. Then, from the spectrum measured, the absorption intensity at 765 cm⁻¹ (characteristic absorption of crystal form α) and the absorption intensity at 840 cm⁻¹ (characteristic absorption of crystal form β) were determined. The starting point and end point of a waveform formed with the wave number set as a peak were connected with a straight line, where the length between the straight line and the peak wave number (peak top) denoted an absorption intensity. For crystal form α, a maximum possible absorption intensity within the wave number range of 775 cm⁻¹ to 745 cm⁻¹ was assumed to be the absorption intensity at 765 cm⁻¹. For crystal form β, a maximum possible absorption intensity within the wave number range of 850 cm⁻¹ to 815 cm⁻¹ was assumed to be the absorption intensity at 840 cm⁻¹.

The α rate was calculated as described above in accordance with the Formula (4a) below on the basis of a value obtained by (i) determining the absorption intensity at 765 cm⁻¹ corresponding to crystal form α and the absorption intensity at 840 cm⁻¹ corresponding to crystal form β and (ii) multiplying the absorption intensity of crystal form α by 1.681 (correction factor) with reference to Japanese Patent Application Publication, Tokukai, No. 2005-200623.

$$\alpha \text{ rate } (\%) = [1 - \{\text{absorption intensity at } 840 \text{ cm}^{-1}/(\text{absorption intensity at } 765 \text{ cm}^{-1} \times \text{correction factor } (1.681) + \text{absorption intensity at } 840 \text{ cm}^{-1})\}] \times 100 \quad (4a)$$

(2) Curl Measurement

An 8 cm×8 cm square was cut out from the laminated body. The cutout was kept at room temperature (approximately 25° C.) and at a dew point of −30° C. for one (1) day. The appearance of the cutout was then evaluated on the basis of the following criterion: The rate "C" represents a state of a complete curl, the rates "A" and "B" each represent a better state, and the rate "A" represents the most preferable state.

A: No curved ends

B: Although an end(s) is curved, the remaining portion is mostly not curved and is flat.

C: Opposite ends curved into a tube shape

Example 1

An N-methyl-2-pyrrolidone (hereinafter referred to also as "NMP") solution (available from Kureha Corporation; product name: L#9305, weight-average molecular weight: 1,000,000) containing a PVDF-based resin (polyvinylidene fluoride-hexafluoropropylene copolymer) was prepared as a coating solution. The coating solution was applied by a doctor blade method to the porous base material produced in Production Example 1 so that the applied coating solution weighed 6.0 g per square meter of the PVDF-based resin in the coating solution. The porous film, to which the coating solution had been applied, was immersed into 2-propanol while the coating film was wet with the solvent, and was then left to stand still at 25° C. for 5 minutes. This produced a laminated porous film (1-i). The laminated porous film (1-i) produced was further immersed into other 2-propanol while the laminated porous film (1-i) was wet with the above immersion solvent, and was then left to stand still at 25° C. for 5 minutes. This produced a laminated porous film (1-ii). The laminated porous film (1-ii) produced was dried at 65° C. for 5 minutes. This produced a laminated body (1). Table 3 shows the results of evaluation of the laminated body (1) produced.

Example 2

A laminated body (2) was prepared by a method similar to the method used in Example 1 except that the porous base material prepared in Production Example 2 was used. Table 3 shows the results of evaluation of the laminated body (2) produced.

Example 3

A laminated body (3) was prepared by a method similar to the method used in Example 1 except that the porous base material prepared in Production Example 3 was used. Table 3 shows the results of evaluation of the laminated body (3) produced.

Example 4

A laminated body (4) was prepared by a method similar to the method used in Example 1 except that the porous base material prepared in Production Example 4 was used. Table 3 shows the results of evaluation of the laminated body (4) produced.

Example 5

A porous film to which a coating solution had been applied as in Example 1 was immersed into 2-propanol while the coating film was wet with the solvent, and was then left to stand still at 0° C. for 5 minutes. This produced a laminated porous film (5-i). The laminated porous film (5-i) produced was further immersed into other 2-propanol while the laminated porous film (5-i) was wet with the above immersion solvent, and was then left to stand still at 25° C. for 5 minutes. This produced a laminated porous film (5-ii). The laminated porous film (5-ii) thus obtained was dried at 30° C. for 5 minutes, so that a laminated body (5) was obtained. Table 3 shows the results of evaluation of the laminated body (5) produced.

Example 6

A porous film to which a coating solution had been applied as in Example 2 was treated by a method similar to the method used in Example 5. This produced a laminated body (6). Table 3 shows the results of evaluation of the laminated body (6) produced.

Example 7

A porous film to which a coating solution had been applied as in Example 3 was treated by a method similar to the method used in Example 5. This produced a laminated body (7). Table 3 shows the results of evaluation of the laminated body (7) produced.

Example 8

A porous film to which a coating solution had been applied as in Example 4 was treated by a method similar to the method used in Example 5. This produced a laminated body (8). Table 3 shows the results of evaluation of the laminated body (8) produced.

Example 9

A porous film to which a coating solution had been applied as in Example 1 was immersed into 2-propanol while the coating film was wet with the solvent, and was then left to stand still at −5° C. for 5 minutes. This produced a laminated porous film (9-i). The laminated porous film (9-i) produced was further immersed into other 2-propanol while the laminated porous film (9-i) was wet with the above immersion solvent, and was then left to stand still at 25° C. for 5 minutes. This produced a laminated porous film (9-ii). The laminated porous film (9-ii) thus obtained was dried at 30° C. for 5 minutes, so that a laminated body (9) was obtained. Table 3 shows the results of evaluation of the laminated body (9) produced.

Example 10

A porous film to which a coating solution had been applied as in Example 2 was treated by a method similar to the method used in Example 9. This produced a laminated body (10). Table 3 shows the results of evaluation of the laminated body (10) produced.

Example 11

A porous film to which a coating solution had been applied as in Example 3 was treated by a method similar to the method used in Example 9. This produced a laminated body (11). Table 3 shows the results of evaluation of the laminated body (11) produced.

Example 12

A porous film to which a coating solution had been applied as in Example 4 was treated by a method similar to the method used in Example 9. This produced a laminated body (12). Table 3 shows the results of evaluation of the laminated body (12) produced.

Example 13

A porous film to which a coating solution had been applied as in Example 2 was immersed into 2-propanol while the coating film was wet with the solvent, and was then left to stand still at −10° C. for 5 minutes. This produced a laminated porous film (13-i). The laminated porous film (13-i) produced was further immersed into other 2-propanol while the laminated porous film (13-i) was wet with the above immersion solvent, and was then left to stand still at 25° C. for 5 minutes. This produced a laminated porous film (13-ii). The laminated porous film (13-ii) produced was dried at 30° C. for 5 minutes. This produced a laminated body (13). Table 3 shows the results of evaluation of the laminated body (13) produced.

Example 14

A porous film to which a coating solution had been applied as in Example 3 was treated by a method similar to the method used in Example 13. This produced a laminated body (14). Table 3 shows the results of evaluation of the laminated body (15) produced.

Example 15

A porous film to which a coating solution had been applied as in Example 4 was treated by a method similar to the method used in Example 13. This produced a laminated body (15). Table 3 shows the results of evaluation of the laminated body (15) produced.

Comparative Example 4

A porous film to which a coating solution had been applied as in Example 1 was immersed into 2-propanol while the coating film was wet with the solvent, and was then left to stand still at −78° C. for 5 minutes. This produced a laminated porous film (17-i). The laminated porous film (17-i) produced was further immersed into other 2-propanol while the laminated porous film (17-i) was wet with the above immersion solvent, and was then left to stand still at 25° C. for 5 minutes. This produced a laminated porous film (17-ii). The laminated porous film (17-ii) thus obtained was dried at 30° C. for 5 minutes, so that a laminated body (16) was obtained. Table 3 shows the results of evaluation of the laminated body (16) produced.

Comparative Example 5

A porous film to which a coating solution had been applied as in Example 2 was treated by a method similar to the method used in Comparative Example 4. This produced a laminated body (17). Table 3 shows the results of evaluation of the laminated body (17) produced.

Comparative Example 6

A porous film to which a coating solution had been applied as in Example 3 was treated by a method similar to the method used in Comparative Example 4. This produced a laminated body (18). Table 3 shows the results of evaluation of the laminated body (18) produced.

Comparative Example 7

A porous film to which a coating solution had been applied as in Example 4 was treated by a method similar to the method used in Comparative Example 4. This produced a laminated body (19). Table 3 shows the results of evaluation of the laminated body (19) produced.

TABLE 3

| | α rate (%) | Curl measurement |
|---|---|---|
| Example 1 | 100 | A |
| Example 2 | 100 | A |
| Example 3 | 100 | A |
| Example 4 | 94 | A |
| Example 5 | 84 | A |
| Example 6 | 87 | A |
| Example 7 | 92 | A |
| Example 8 | 80 | A |
| Example 9 | 63 | A |
| Example 10 | 74 | A |
| Example 11 | 78 | A |
| Example 12 | 64 | A |
| Example 13 | 36 | B |
| Example 14 | 45 | A |
| Example 15 | 39 | A |
| Comparative Example 4 | 21 | C |
| Comparative Example 5 | 29 | C |
| Comparative Example 6 | 27 | C |
| Comparative Example 7 | 25 | C |

[Results]

For the laminated bodies (1) to (15), which were produced in Examples 1 to 15 and each of which included a porous layer containing a PVDF-based resin that contained crystal form α in an amount (α rate) of not less than 36% with respect to the crystal form α and crystal form β combined, the measurement results show that curls were prevented. On the other hand, for the laminated bodies (16) to (19), which were produced in Comparative Examples 4 to 7 and for each of which the α rate was less than 36%, the measurement results show that clear curls occurred.

The above indicates that a laminated body in accordance with an embodiment of the present invention which laminated body has an α rate of not less than 36% is not easily curled.

There is a relationship between (i) the structure of pores of a porous base material (namely, the capillary force in the pores and the area of the wall of the pores) in a laminated body and the capability to supply an electrolyte from the porous base material to the electrodes and (ii) how the rate characteristic is degraded as the battery is charged and discharged repeatedly and/or the battery is used with a large electric current. In other words, the rate characteristic of the laminated body depends on the properties of the porous base material. The laminated bodies produced in Examples 1 to 15 were each produced with use of the porous base material produced in one of Production Examples 1 to 4. As shown in Table 2, a nonaqueous electrolyte secondary battery including the porous base material produced in any of Production Examples 1 to 4 showed an excellent rate characteristic. It follows that a nonaqueous electrolyte secondary battery including the laminated body produced in any of Examples 1 to 15 understandably each showed an excellent rate characteristic as well.

The results of Production Examples, Examples, and Comparative Examples described above show that the laminated bodies produced in Examples 1 to 15 (laminated bodies in accordance with an embodiment of the present invention) can each impart an excellent rate characteristic to a nonaqueous electrolyte secondary battery including the laminated body as a separator and are not easily curled.

INDUSTRIAL APPLICABILITY

A laminated body in accordance with an embodiment of the present invention is not easily curled, and is suitably usable in a nonaqueous electrolyte secondary battery.

The invention claimed is:

1. A laminated body, comprising:
a porous base material containing a polyolefin-based resin as a main component; and
a porous layer on at least one surface of the porous base material, the porous layer containing a polyvinylidene fluoride-based resin,
the porous base material having a temperature rise ending period of 2.9 seconds·m$^2$/g to 5.7 seconds·m$^2$/g with respect to an amount of resin per unit area in a case where the porous base material has been impregnated with N-methylpyrrolidone containing 3% by weight of water and has then been irradiated with a microwave having a frequency of 2455 Hz and an output of 1800 W,
the polyvinylidene fluoride-based resin containing crystal form α in an amount of not less than 36 mol % with respect to 100 mol % of a total amount of the crystal form α and crystal form β contained in the polyvinylidene fluoride-based resin,
where the amount of the crystal form α is calculated from an absorption intensity at around 765 cm$^{-1}$ in an IR spectrum of the porous layer, and an amount of the crystal form β is calculated from an absorption intensity at around 840 cm$^{-1}$ in the IR spectrum of the porous layer.

2. The laminated body according to claim 1, wherein
the polyvinylidene fluoride-based resin contains (i) a homopolymer of vinylidene fluoride and/or (ii) a copolymer of vinylidene fluoride and at least one monomer selected from the group consisting of hexafluoropropylene, tetrafluoroethylene, trifluoroethylene, trichloroethylene, and vinyl fluoride.

3. The laminated body according to claim 1, wherein
the polyvinylidene fluoride-based resin has a weight-average molecular weight of not less than 200,000 and not more than 3,000,000.

4. The laminated body according to claim 1, wherein
the porous layer contains a filler.

5. The laminated body according to claim 4, wherein
the filler has a volume-average particle size of not less than 0.01 μm and not more than 10 μm.

6. A nonaqueous electrolyte secondary battery member, comprising:
a cathode;
a laminated body according to claim 1; and
an anode,
the cathode, the laminated body, and the anode being arranged in this order.

7. A nonaqueous electrolyte secondary battery, comprising as a separator a laminated body according to claim 1.

* * * * *